No. 651,668. Patented June 12, 1900.
E. G. LATTA.
VELOCIPEDE FRAME.
(Application filed Apr. 16, 1900.)
(No Model.) 3 Sheets—Sheet 1.
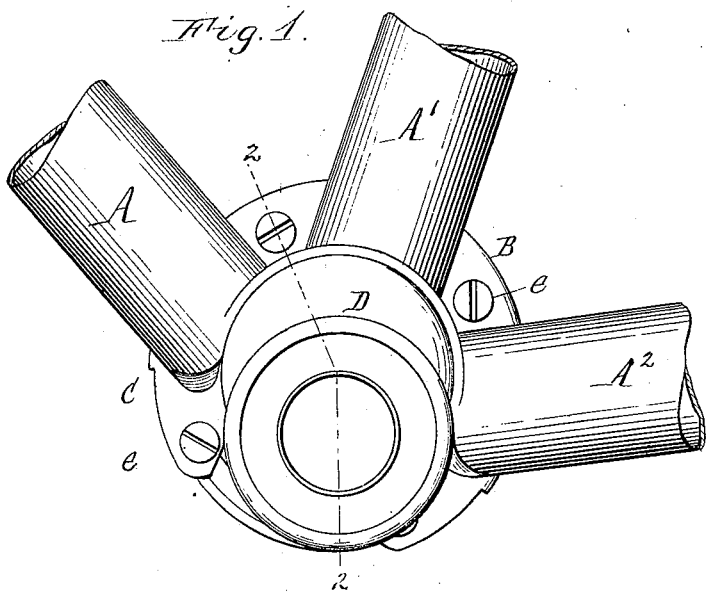
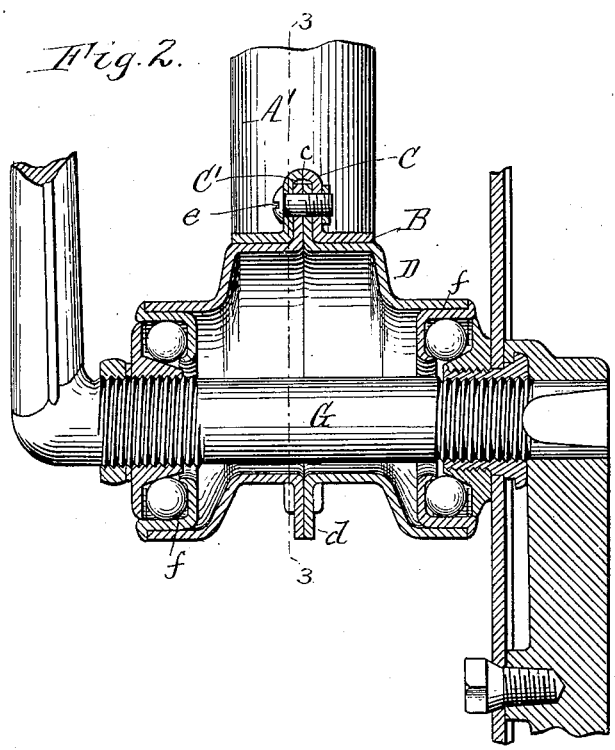
Witnesses
E. A. Volk.
F. F. Scherzinger.
E. G. Latta Inventor
By Wilhelm Bonner
Attorneys.

No. 651,668. Patented June 12, 1900.
E. G. LATTA.
VELOCIPEDE FRAME.
(Application filed Apr. 16, 1900.)
(No Model.) 3 Sheets—Sheet 2.

Witnesses: E. A. Volk. F. F. Schurziger.

Inventor: E. G. Latta
By Wilhelm Bonner
Attorneys.

No. 651,668. Patented June 12, 1900.
E. G. LATTA.
VELOCIPEDE FRAME.
(Application filed Apr. 16, 1900.)
(No Model.) 3 Sheets—Sheet 3.

Witnesses:
E. A. Volk
F. F. Schuzinger

E. G. Latta Inventor
By Wilhelm Bonner
Attorneys.

UNITED STATES PATENT OFFICE.

EMMIT G. LATTA, OF FRIENDSHIP, NEW YORK.

VELOCIPEDE-FRAME.

SPECIFICATION forming part of Letters Patent No. 651,668, dated June 12, 1900.

Application filed April 16, 1900. Serial No. 12,991. (No model.)

*To all whom it may concern:*

Be it known that I, EMMIT G. LATTA, a citizen of the United States, residing at Friendship, in the county of Allegany and State of New York, have invented new and useful Improvements in Velocipede-Frames, of which the following is a specification.

The principal object of my invention is the production of a velocipede frame and crank-shaft hanger which permit the shaft and its bearings to be finished, completely assembled, and adjusted for use independently of the frame, so that the shaft and bearings may be made by one manufacturer and the frame by another and the frame be enameled ready for sale before applying the shaft and bearings to the same.

A further object of the invention is to so construct the hanger and the frame that crank-shaft bearings of different kinds and sizes can be applied to or interchangeably used on the same frame, and more particularly so that either concentric or offset or eccentric bearings can be applied to the same frame.

Figure 3:
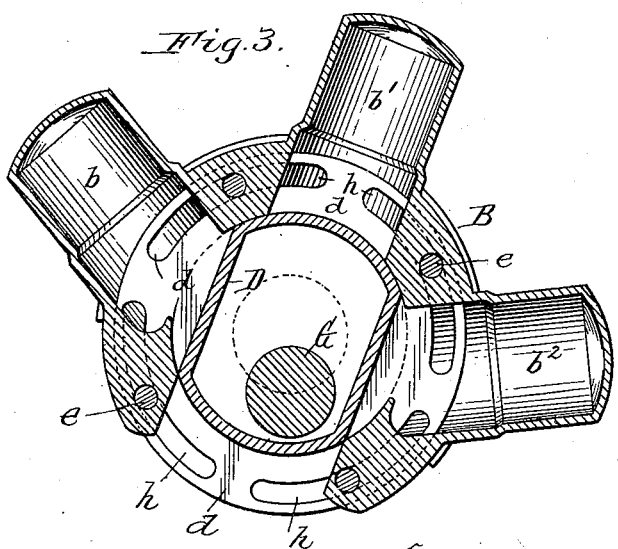
Figure 4:
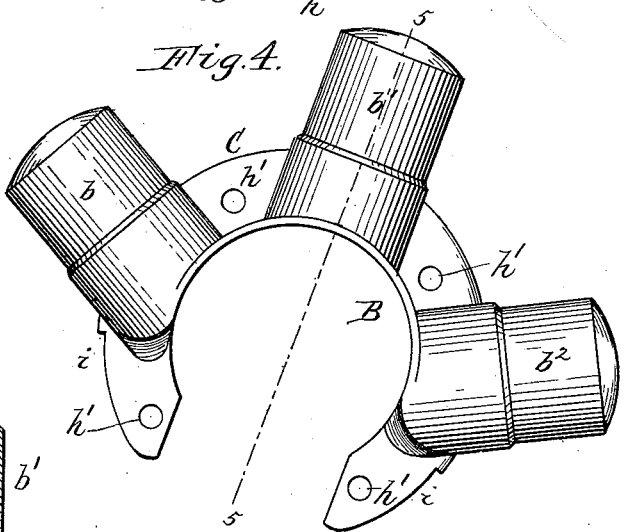
Figure 5:
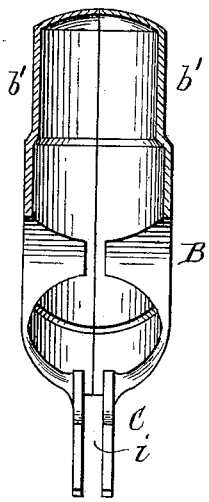
Figure 6:
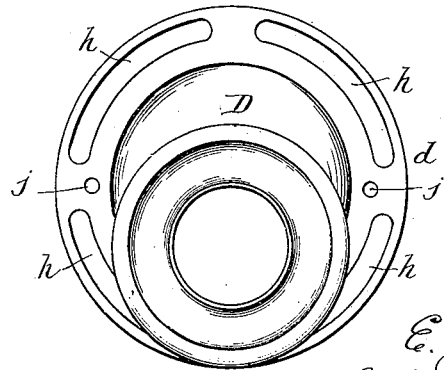
Figure 7:
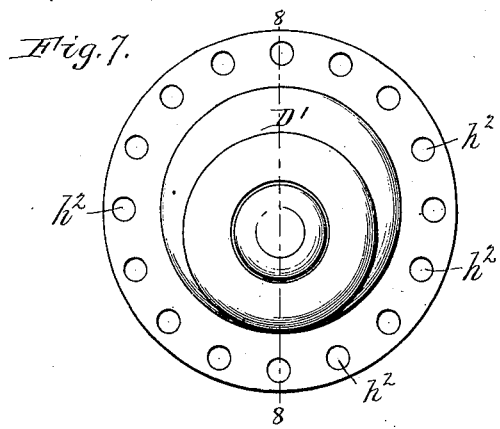
Figure 8:
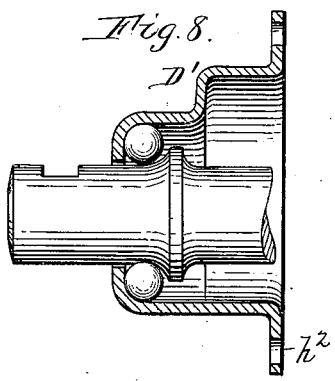
Figure 9:
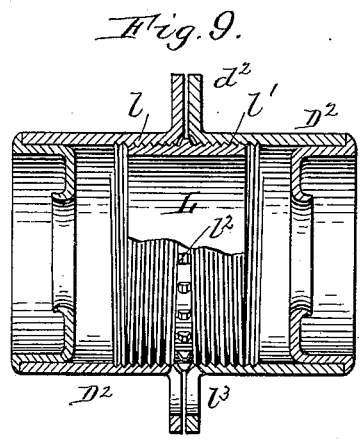
Figure 10:
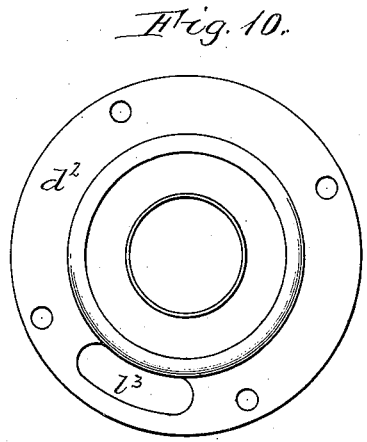
Figure 11:
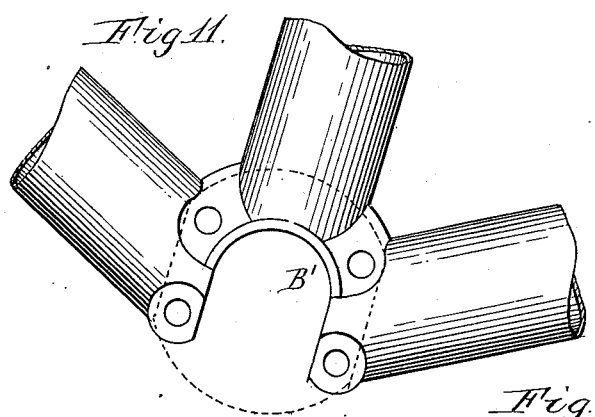
Figure 12:
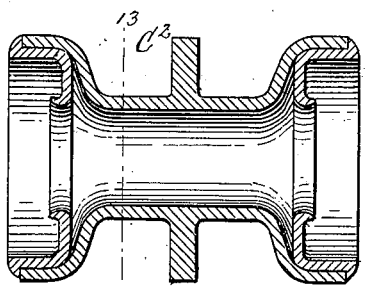
Figure 13:
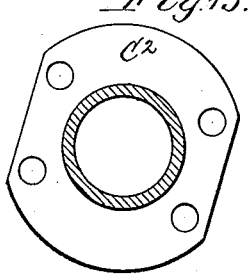

In the accompanying drawings, consisting of three sheets, Figure 1 is a side elevation of the crank-shaft hanger and the adjacent portion of the velocipede-frame, the hanger being of the eccentric type. Fig. 2 is a transverse section in line 2 2, Fig. 1, the crank-shaft and bearings being in place in the hanger. Fig. 3 is a longitudinal section in line 3 3, Fig. 2. Fig. 4 is a detached side elevation of one of the halves or sections of the frame connection. Fig. 5 is a transverse section in line 5 5, Fig. 4. Fig. 6 is a detached side elevation of one of the halves or sections of the hanger. Fig. 7 is a similar view of a modified construction of the hanger. Fig. 8 is a vertical section in line 8 8, Fig. 7. Fig. 9 is a detached longitudinal section of another modified construction of the hanger. Fig. 10 is a side elevation of said hanger. Fig. 11 is a side elevation showing a modified construction of the connection between the frame-tubes. Fig. 12 is a longitudinal section of the hanger which is used with said connection. Fig. 13 is a transverse section in line 13 13, Fig. 12.

Like letters of reference refer to like parts in the several figures.

Referring to the construction shown in Figs. 1 to 6, A A' A² are the usual frame-tubes which meet at the crank-shaft hanger and which are united by a bracket or connection B. This connection is substantially crescent-shaped and arranged to open downwardly and is provided on its front, upper, and rear sides with projecting lugs or thimbles $b$ $b'$ $b^2$, to which the frame-tubes are brazed. The body of the connection is substantially semicylindrical and provided centrally with a hollow projecting flange or enlargement C, which forms an internal crescent-shaped groove or socket C', extending to the extremities of the connection. The latter is preferably composed of two similar sections or halves, which meet in a transverse joint $c$, located in the center of the connection. Each of these sections is stamped from a plate of sheet metal and carries one-half of the central socket C' and one-half of the lugs $b$ $b'$ $b^2$, as shown in Figs. 4 and 5, so that upon placing the two sections together, as shown in Fig. 2, they form the complete connection.

D is the crank-shaft hanger or bearing-box, which is seated in the bracket or connection B and which is provided centrally with a projecting transverse flange or enlargement $d$, which fits into the crescent-shaped groove or socket C' of the connection, as shown in Figs. 2 and 3. The hanger is firmly secured in the connection by transverse bolts $e$, passing through the walls of the socket C' and the flange $d$ of the hanger. The hanger is preferably divided transversely into two similar sections, which are provided at their inner ends with abutting flanges, which together form the main flange or enlargement $d$, as shown in Fig. 2. The central or body portion of the hanger is preferably offset or arranged eccentrically with reference to its cylindrical end portions, in which the ball-cups $f$ are seated, and the hanger is capable of rotary adjustment in the frame connection B, so that by turning or reversing the hanger in its seat the crank-shaft G is raised or lowered or shifted backwardly or forwardly, thereby permitting the drop of the frame to be changed and also enabling the driving-chain to be adjusted. To permit of this adjustment, the abutting flanges $d$ of the hanger are provided with curved or segmental slots $h$, through which the fastening-bolts $e$ pass and which register with bolt-holes $h'$, formed in the hollow flange C of the connection B. The hanger-flange is preferably provided with four of such slots, and the connection B has a corresponding number of equidistant bolt-holes, as shown. With this equidistant arrangement of the bolt-holes the ends of the cresent-shaped connection approach each other so closely that the intervening opening or passage is too narrow to admit the hanger if constructed on all sides of the same diameter as its circular seat in the connection B, and in order to allow the hanger to enter a connection of this construction the hanger is depressed or flattened sufficiently on opposite sides for this purpose, as shown in Fig. 3. The end portions of the crescent-shaped socket C' are provided in their outer sides with slots $i$, which extend upwardly a sufficient distance to permit the flange of the hanger to enter the socket. After inserting the hanger in the connection to the position shown in Fig. 3 the same can be turned therein; but in order to remove the hanger the same must first be turned to bring its narrow dimension into register with the bottom opening of the connection.

The flanges of the hanger-sections are provided with small registering holes $j$ for the reception of pins, which keep the sections in alinement with each other.

The two parts of the hanger, like those of the connection B, are identical and preferably stamped from sheet metal, and the parts of the hanger and the connection can therefore be made with but two sets of dies.

In assembling the parts the two flange-sections of the hanger, with the bearing-cups applied thereto, are brought together, and the crank-shaft is then inserted in the hanger and the bearings are adjusted ready for service. In this condition these assembled parts may be stored or shipped to a distant market independently of the frame, which latter can be made in another place or by a different manufacturer, and whenever desired the hanger, with its contained parts, is readily applied to the frame by passing the hanger upwardly into the socketed connection B and securing the same therein by the bolts $e$. Upon loosening these bolts the hanger can be turned in its seat to adjust its offset ends either high or low or fore or aft, so as to locate the crank-shaft in any desired position on the dotted circle, (shown in Fig. 3,) the bolts being again tightened after adjusting the hanger.

The driving-chain can be adjusted by loosening the bolts $e$ and turning the hanger so as to move the crank-shaft forward slightly, after which the bolts are again tightened. In case the hanger is in its foremost position it is necessary to remove a link from the chain and readjust the latter by turning the hanger backwardly. With the use of a single hanger a bicycle may thus be had with a high or low frame or a frame of medium height, with either a front or a rear position of the crank-shaft, as desired.

Hangers constructed according to my invention may be made of different degrees of eccentricity, but so that the different styles fit the same connection or bracket. For instance, in Figs. 7 and 8 is shown an eccentric hanger D' which has less offset than that of the construction first described and which permits only about one-half of the adjusting range afforded by that construction. This hanger is constructed substantially like that first described; but the ball-cups face inwardly and are formed integral with the hanger. This hanger does not afford sufficient throw to serve as a chain-adjuster, but can be turned to change the drop of the frame. The meeting flanges of the hanger are in this case provided with an annular series of openings $h^2$ for the passage of the fastening-bolts instead of the curved slots $h$ of the construction previously described.

In the modified construction shown in Figs. 9 and 10 the hanger consists of two short cylindrical sections $D^2$, provided at their inner ends with attaching-flanges $d^2$, as in the previous construction, and with outwardly-facing bearing-cups which are not offset, but concentric with the hanger. This construction requires but four bolt-holes in the hanger-flange. In this case the hanger-sections are connected by a short internal sleeve L, which engages with the sections by right and left hand screw-threads $l$ $l'$, so that upon turning the sleeve in the proper direction the hanger-sections are spread apart, thereby taking up any wear of the bearings. The sleeve is provided externally with an annular row of teeth or projections $l^2$ for turning it, which teeth are accessible through an opening $l^3$, formed in the opposing edges of the hanger-sections and their flanges. To effect this adjustment, the bolts which secure the hanger to the frame are first loosened, and the sleeve L is then properly turned. The walls of the socket which receive the flanges of the hanger-sections will yield or spread sufficiently to permit a slight adjustment of the bearings, which is all that is required when the bearings are well made. When this form of adjustment is employed, both bearing-cones may be non-adjustable or fixed to the crank-shaft.

In Figs. 11, 12, and 13 is shown a lighter and more compact construction of the hanger and the bracket or frame connection. In this case the central portion of the hanger is of smaller diameter than its ends to permit the use of a small connection B'. This hanger may be machined from a solid bar or cast of malleable iron. The hanger is provided with a single integral attaching-flange $C^2$, which is cut away slightly on opposite sides of the hanger, as shown in Fig. 13, and the end portions of the connection B' are straight or parallel in this case, and the socket of the connection is only as deep as the flattened portions of the hanger-flange.

In each of the several constructions herein shown and described the bracket or union which connects the frame-tubes is provided centrally with an internal transverse groove or socket which receives an attaching-flange projecting from the hanger-body. This produces a very rigid connection which is simple in construction and sightly in appearance.

I claim as my invention—

1. The combination with the frame members of a velocipede, of a bracket or union connecting the same and provided with an internal socket, and a crank-shaft hanger arranged in said bracket and provided with a projecting flange which is seated in the socket of the bracket, substantially as set forth.

2. The combination with the frame members of a velocipede, of a semicircular bracket connecting the same and provided with an internal socket, a crank-shaft hanger arranged in said bracket and provided with a transverse flange which is seated in the socket of the bracket and transverse fastening-bolts which pass through said hanger-flange and the walls of said socket, substantially as set forth.

3. The combination with the frame members of a velocipede, of a bracket connecting the same and provided with an internal socket, and a crank-shaft hanger composed of similar sections provided at their meeting ends with projecting flanges which are seated in the socket of the bracket, substantially as set forth.

4. The combination with the frame members of a velocipede, of a bracket connecting the same and provided with a socket, and a crank-shaft hanger having eccentric end portions containing shaft-bearings and provided between said end portions with a projecting flange which is seated in the socket of the bracket, substantially as set forth.

5. The combination with the frame members of a velocipede, of a bracket connecting the same and provided with a socket, an adjustable crank-shaft hanger having eccentric end portions and a projecting flange which is seated in said socket and provided with one or more curved slots, and fastening-bolts passing through said slots and the walls of said socket, substantially as set forth.

6. The combination with the frame members of a velocipede, of a bracket connecting the same and having an open lower side, said bracket forming a substantial semicircular seat and being provided on the upper, front and rear sides of said seat with a groove or socket, and an adjustable crank-shaft hanger capable of turning in said seat and having offset end portions and a projecting flange which is adjustably secured in said socket, substantially as set forth.

7. The combination with the frame members of a velocipede, of a crescent-shaped bracket provided with an internal groove or socket and projecting lugs for the attachment of the frame members, and a crank-shaft hanger seated in said bracket and provided with a projecting flange which is secured in the socket of the bracket, substantially as set forth.

8. The combination with the frame members of a velocipede, of a crescent-shaped bracket having its opening at its lower side, and provided with an internal socket and projecting thimbles for the attachment of the frame-tubes, said bracket being composed of two similar sections or halves which meet in a joint extendimg centrally through said socket and said thimbles, the bracket being adapted to receive a crank-shaft hanger having a flange which enters the socket of the bracket, substantially as set forth.

Witness my hand this 7th day of April, 1900.

EMMIT G. LATTA.

Witnesses:
CARL F. GEYER,
CLAUDIA M. BENTLEY.